United States Patent Office 3,840,671
Patented Oct. 8, 1974

3,840,671
PROCESS FOR PRODUCING FIBROUS PROTEIN PRODUCT
Kwang Young Kim and Naoki Yagi, Miyakonozyo, Japan, assignors to Minaminihon Rabuno Kyodo Kabushiki Kaisha, Miyakonozyo-shi, Miyazaki-ken, Japan
No Drawing. Filed Dec. 28, 1971, Ser. No. 213,209
Claims priority, application Japan, Dec. 30, 1970, 46/127,410
Int. Cl. A23j 3/00
U.S. Cl. 426—42
10 Claims

ABSTRACT OF THE DISCLOSURE

A process for producing a fibrous protein product having excellent stickiness and toughness characteristics, useful as a food material, which comprises treating a fibrous protein with an aqueous solution of a polysaccharide capable of chemically or physically bonding with a protein, the fibrous protein being prepared by treating an aqueous solution of a non-fibrous protein adjusted to a pH of 6 to 9 with a gelating agent and a protease at 10 to 80° C. and inactivating the protease in the resulting product.

---

The present invention relates to a process for producing fibrous protein products, having excellent stickiness and toughness, properties from non-fibrous proteins.

In recent years, extensive studies have been conducted on protein foods and various edible protein foods such as so-called artificial meats, have been introduced into practical use. These products may be divided into two broad classes, i.e. fibrous protein foods and textured protein foods. The products in the former class have a texture like natural meat but require a complex manufacturing process which lowers the nutritive value and are obtained in an inferior yield which renders them costly, while those in the latter class do not so have the texture of natural meat.

For making a non-fibrous protein fibrous, there has been adopted a method which comprises extruding a solution of the protein into an acid solution by the aid of a special spinning device. With such method, however, the operation is complicated and the fibers produced are so uniform in shape and in properties that the product does not have the texture of natural meat when tasted.

As result of the extensive studies, it has been found that the treatment of a solution of a non-fibrous protein, suitably adjusted in pH, with a gelating agent and a protease produces a fibrous protein product. It has also been found that the stickiness and toughness of such fibrous protein product are made stable to heat by treatment with a polysaccharide. The present invention is based on these findings.

According to the present invention, a non-fibrous protein is made fibrous by treating with a gelating agent and a protease in an aqueous solution adjusted to a pH of 6 to 9.

The starting non-fibrous protein may be an animal or vegetable protein such as casein or glycinin.

Examples of the gelating agent are divalent metal salts, such as calcium chloride and magnesium chloride.

As the protease material, there may be used microbial protease, tryspin, chymotryspin, papain and the like.

In carrying out the present invention, the starting non-fibrous protein is first dissolved in an aqueous medium and adjusted to a pH of 6 to 9, preferably of around 7. When the pH is higher than 9, the protein is unfavorably denatured. When the pH is lower than 6, the protein is dissolved with difficulty so that the gelating agent can not uniformly act thereon. The concentration of the protein in the solution is normally from 5 to 30% by weight, preferably from 15 to 20% by weight. In case the concentration is higher than 30% by weight, the protein is not completely dissolved and the protease can not sufficiently act thereon. Thus, the resulting product is not fibrous. In the case of the concentration being lower thna 5%, the action of the protease is insufficient, and a fibrous protein product can not be obtained.

In order to realize the said pH range, the protein is usually dissolved in an aqueous solution of an alkaline substance such as sodium hydroxide, sodium phosphate or ammonia.

The resultant dispersion is then treated with the gelating agent and the protease simultaneously or stepwise, usually at a temperature of 10 to 80° C., preferably of 50 to 70° C. The gelating agent is normally used in 1 to 20 parts by weight, preferably in 3 to 10 parts by weight, to 1 part by weight of the protein. The amount of the protease is dependent upon the enzymatic activity and, for instance, 0.01 to 1 g. of a commercially available protein "Proyzme" (manufactured by Kyowa Hakko Kogyo K.K.) may be used for 100 g. of the protein.

Ordinarily, the solution is first treated with the gelating agent to make a colloidal solution and the latter is then treated with the protease to make a gel, which releases water to give a fibrous product.

Preparation of the colloidal solution is effected under stirring. The preparation is usually perfected in 5 minutes to 1 hour. Then, the protease is added thereto. The formation of the fibrous product is normally completed in 10 to 30 minutes. A longer time of treatment with the protease is not favorable, because the decomposition of the once produce fibrous product proceeds.

The thus obtained fibrous porduct is then subjected to a physical treatment such as stretching whereby orientation is imparted thereto. The temperature under which the physical treatment is carried out is normally from 15 to 35° C., favorably around 25 to 30° C. The physical treatment is desirable for accomplishng efficiently the fixation in the subsequent step.

The thus oriented fibrous product contains the protease and, when allowed to stand as such, undergoes gelatinization due to the enzymatic activity which will destroy the fibrous structure. In order to prevent gelatinization, the inactivation of the remaining protease is necessary. It may be also necessary to modify the side chain of the protein molecule. Thus, the fibrous product is fixed by a conventional procedure usually adopted for fixation of proteins. For instance, the fibrous product is treated with acetic anhydride, usually at a temperature from 0 to 30° C. for 3 to 10 minutes whereby the resultant protein product can maintain a stable fibrous structure even when heated. The use of any acidic solution in place of acetic anhydride is effective for the inactivation of the protease but is not effective for modification of the side chain of the protein molecule. Thus, the stabilization of the fibrous structure to heat can not be attained.

The thus obtained fibrous protein product is, usually after neutralization of the fixing agent (e.g. acetic anhydride), washed with water and dried. The dried product can be stored stably for a long duration.

The fixed fibrous product as above obtained is sticky and tough and may be used as such for the production of an artificial meat product. However, the stickiness and toughness are sometimes still unsatisfactory and, particularly when mixtures of the fibrous product and any natural fish or meat material are heated, such properties may be quickly lost. In order to avoid such disadvantages, the fibrous product may be treated with a polysaccharide capable of chemically or physically bonding with proteins.

This treatment for improving the stickiness and toughness on heating is effected by treating the fibrous product with an aqueous solution of a polysaccharide such as carboxymethylcellulose, sodium alginate, carrageenin or guar gum, normally at a temperature from 10 to 30° C. for 5 to 30 minutes. The concentration of the polysaccharide in the solution may be usually from 0.5 to 5% by weight. The aqueous solution of the polysaccharide is favored to be absorbed in the fibrous product so as to make the water content of the resultant product to be 50 to 80% by weight. The said aqueous solution of the polysaccharide may also include a coloring agent, a seasoning agent, a flavoring agent or the like so that the product absorbed with such solution has an appearance, feeling and taste like natural meat.

A product having thick fibers or a coarse texture can be obtained as desired by using different kinds of non-fibrous proteins and gelating agents and employing proteases under different conditions. In addition, by changing the method of cutting off the product, the product may be manufactured in the form of chunks, grains or flakes. Drying will produce a dry product which can readily be converted to a fibrous structure by treatment with hot water at about 60 to 80° C.

The process of the invention is very simple and requires only mild treating conditions so that high yields are insured without deterioration of the nutritive value of the final product. Since the product is composed of fibrous protein fibers of various forms in an irregularly entangled state, it has a close resemblance to natural meat and is very pleasing to feel, to chew and to taste. On the other hand, fibrous protein foods produced by the conventional spinning methods are agglomerates of fibers having uniform thicknesses, which are different than the products of the present invention made up of fibers having uneven thicknesses. Because the reaction product of the present invention is subjected to a stretching operation fibers of uneven thicknesses are oriented in the stretching direction and, consequently, a meat-like product of a desired size can be manufactured simply by cutting off without the addition of binding agents.

The practical and preferred embodiments of the present invention will be illustrated in the following Examples wherein percents are by weight.

EXAMPLE 1

A solution of casein (70 g.) in water (500 ml.) is heated at about 50° C., and the pH is adjusted to around 7.0 with an aqueous sodium hydroxide solution while stirring. By the addition of calcium chloride (2 g.) to the resulting solution under stirring, a white turbid solution is obtained. After the addition of protease (100 mg.), the resulting mixture is kept at about 50° C. while stirring. Gelation of the protein begins in about 5 minutes, gradually rendering the material fibrous with the release of water. By stretching the resultant material, a fibrous protein is obtained. The fibrous protein (water content, 70%; 230 g.) is treated with a 5% aqueous solution of acetic anhydride (300 ml.) at 15° C. for 5 minutes to modify the side chain and inactivate the enzyme. The product is then neutralized with an aqueous calcium hydroxide solution, washed with water and squeezed whereby about 200 g. of a fibrous protein product (water content, 65%) is obtained.

EXAMPLE 2

A suspension of casein (70 g.) and glycinin (30 g.) in water (500 ml.) is heated at about 60° C., and the pH is adjusted to about 7.0 with ammonia water while stirring. Protease (150 mg.) is added thereto. After 2 or 3 minutes, calcium chloride (5 g.) is further added to the resultant mixture whereby the protein begins to gel and finally becomes fibrous. The resultant material is subjected to stretching. The obtained fibrous protein (water content, 70%; 333 g.) is treated with a 5% aqueous solution of acetic anhydride (400 ml.) as in Example 1. The product is then neutralized, washed with water and squeezed to give about 300 g. of a fibrous protein product (water content, 67%).

In an aqueous suspension of beef flavor, beef paste and a coloring agent, the fibrous protein product is immersed and adjusted to a pH of around 6.6 with a phosphate whereby a beef-like product is obtained.

EXAMPLE 3

In a solution of methylcellulose (1 g.), sodium polyphosphate (0.6 g.) and beef extract (10 g.) in water (50 ml.), a fibrous protein product (100 g.) (pH 5.8; water content, 65%) as prepared in Example 1 is immersed for about 5 minutes. The resultant product, which has absorbed the entire solution, has a beef-like feel and taste.

EXAMPLE 4

In a solution of carrageenin (0.5 g.), carboxymethylcellulose (1.0 g.), disodium hydrogenphosphate (1.0 g.) and pork extract (10 g.) in water (120 ml.), a fibrous protein product (100 g.) (pH 5.8; water content, 65%) as prepared in Example 1 is immersed for about 10 minutes. The resultant product, which has absorbed the entire solution, has a pork like feel and taste.

Test

A fibrous product mainly consisting of calcium caseinate (hereinafter referred to as "Product A") as prepared in Example 1, was admixed with crushed meat of cod-fish, and the resultant mixture was ground at about 5° C. After casing, the resultant product was heated at 80 to 85° C. for 30 minutes and then subjected to various measurements to determine the jelly strength thereof. The results are shown in Table 1.

TABLE 1

| Weight percent of product A in cod-fish meat (%): | Jelly strength, g. |
|---|---|
| 10 | 930 |
| 20 | 810 |
| 30 | 670 |
| 0 | 1116 |

From the above table, it is understood that the addition of the Product A results in the depression of the jelly strength, which is an indication of the loss of stickiness and toughness.

In a solution of carboxymethylcellulose (1 g.) and sodium polyphosphate (0.8 g.) in water (20 ml.), the Product A (100 g.) was immersed to obtain a coated fibrous protein product (hereinafter referred to as "Product B"). The Product B was admixed with crushed of cod-fish, and the resultant mixture was ground at about 5° C. After casing, the resulting product was heated at 80 to 85° C. for 30 minutes and then subjected to various measurements to determine the jelly strength. The results are shown in Table 2.

TABLE 2

| Weight percent of Product B in cod-fish meat (%) | Jelly strength, g. |
|---|---|
| 10 | 1200 |
| 20 | 1150 |
| 30 | 1180 |
| 0 | 1130 |

From the above table, it is understood that the addition of the Product B results in the increase of the jelly strength.

What is claimed is:

1. A process for producing a fibrous protein product which comprises stirring at a temperature of 10° C. to 80° C., an aqueous solution of 5–30% by weight of a non-fibrous protein adjusted to a pH of 6 to 9 with a gelating agent selected from the group consisting of calcium chloride and magnesium chloride and a protease, for a time sufficient to convert the non-fibrous protein to fibrous protein, said gelating agent being present in an amount of 1–20 parts by weight per 1 part by weight of the protein and the protease is present in amounts of 0.01 to 1 g. per 100 g. of the protein, stretching the resulting product so as to impart an orientation thereto and inactivating the protease in the resultant product.

2. A process according to claim 1, wherein the protease is selected from the group consisting of microbial protease, trypsin, chymotryspin and papain.

3. A process according to claim 1, wherein the non-fibrous protein is selected from the group consisting of casein and glycinin.

4. A process according to claim 1, wherein the non-fibrous protein is casein.

5. A process according to claim 1, wherein inactivation of the protease is effected in an acidic solution.

6. A process according to claim 5, wherein the inactivation of the protease is conducted in an acetic anhydride solution at a temperature of 0° C. to 30° C. for 3 to 10 minutes.

7. A process for producing a fibrous protein product which comprises stirring at a temperature of 10° C. to 80° C., an aqueous solution of 5–30% by weight of a non-fibrous protein adjusted to a pH of 6 to 9, with a gelating agent selected from the group consisting of calcium chloride and magnesium chloride and a protease, for a time sufficient to convert the non-fibrous protein into fibrous protein, said gelating agent being present in an amount of 1–20 parts by weight per 1 part by weight of the protein and wherein the protease is present in an amount of 0.01 to 1 g. per 100 g. of the protein, stretching the resultant product so as to impart an orientation thereto and inactivating the protease in the resultant product with acetic anhydride, followed by contacting the protein with an aqueous solution of a polysaccharide so that the polysaccharide solution is absorbed into the thus-obtained fibrous product.

8. The process according to claim 7, wherein the non-fibrous protein mainly consists of calcium caseinate.

9. A process according to claim 7, wherein the polysaccharide is selected from the group consisting of carboxymethyl cellulose, sodium alginate, carageenin and guar gum.

10. A process according to claim 9, wherein the polysaccharide is present in the aqueous solution in an amount of 0.5 to 5% by weight and wherein the water content of the resultant fibrous product is 50% to 80% by weight as a result of contacting the fibrous protein with the aqueous solution of the polysaccharide.

References Cited
UNITED STATES PATENTS 3,694,221   9/1972   Hoer et al. _____ 99—17

JAMES R. HOFFMAN, Primary Examiner

U.S. Cl. X.R.

426—46, 802